(12) United States Patent
Destura et al.

(10) Patent No.: US 8,325,143 B2
(45) Date of Patent: Dec. 4, 2012

(54) TOUCH SENSITIVE DISPLAY FOR A PORTABLE DEVICE

(75) Inventors: Galileo June Adeva Destura, Eindhoven (NL); Hjalmar Edzer Ayco Huitema, Eindhoven (NL); Martinus Hermanus Wilhelmus Maria Van Delden, Eindhoven (NL); Jozef Thomas Martinus Van Beek, Eindhoven (NL); Antonius Lucien Adrianus Maria Kemmeren, Eindhoven (NL)

(73) Assignee: Creator Technology B.V., Breda (NL)

( * ) Notice: Subject to any disclaimer, the term of this patent is extended or adjusted under 35 U.S.C. 154(b) by 1535 days.

(21) Appl. No.: 10/564,920

(22) PCT Filed: Jul. 8, 2004

(86) PCT No.: PCT/IB2004/051173
§ 371 (c)(1), (2), (4) Date: Jan. 17, 2006

(87) PCT Pub. No.: WO2005/008462
PCT Pub. Date: Jan. 27, 2005

(65) Prior Publication Data
US 2006/0209039 A1 Sep. 21, 2006

(30) Foreign Application Priority Data
Jul. 21, 2003 (EP) .................................... 03102238

(51) Int. Cl.
*G09G 5/00* (2006.01)
(52) U.S. Cl. ........ 345/173; 345/174; 345/175; 345/176; 345/177; 345/178
(58) Field of Classification Search ........... 345/173–178
See application file for complete search history.

(56) References Cited

U.S. PATENT DOCUMENTS

| | | | | |
|---|---|---|---|---|
| 5,907,375 A | * | 5/1999 | Nishikawa et al. | 349/12 |
| 6,133,906 A | * | 10/2000 | Geaghan | 345/179 |
| 6,392,636 B1 | * | 5/2002 | Ferrari et al. | 345/173 |
| 6,535,091 B2 | * | 3/2003 | Bechtle et al. | 333/262 |
| 6,762,752 B2 | * | 7/2004 | Perski et al. | 345/173 |
| 7,109,967 B2 | * | 9/2006 | Hioki et al. | 345/104 |

* cited by examiner

*Primary Examiner* — Grant Sitta

(57) ABSTRACT

A portable device is provided having a touch sensitive display (100) comprising an active matrix display element (101) and a touch sensitive element (103). The touch sensitive element (103) is disposed on the viewer distal side of the active matrix display element (101) thereby not affecting the display properties. The touch sensitive element (103) comprises a first and second conductive layer (113, 115) each having a plurality of conductors. The conductive layers (113, 115) sandwich a pressure sensitive layer (117) which modifies an electrical conductivity between two conductors of the two conductive layers (113, 115) in response to a pressure point resulting from an applied pressure. Thus, accurate position detection is achieved. The conductors may be aligned with the active matrix and the requirement for calibration may be obviated.

18 Claims, 4 Drawing Sheets

TOUCH SENSITIVE DISPLAY FOR A PORTABLE DEVICE

FIELD OF THE INVENTION

The invention relates to a portable device and a touch sensitive display therefor and in particular to a touch sensitive display comprising an active matrix display element and a touch sensitive element.

BACKGROUND OF THE INVENTION

In recent years, there has been a general trend towards reduced size and increased mobility for many types of consumer equipment. For example, the use of portable phones, computers, personal music systems and personal digital Assistants (PDAs) have become increasingly widespread.

The market for handheld and portable consumer electronics and computing has significantly diversified in the last decade. The trend has increasingly been towards smaller devices capable of displaying increasing amounts of information leading to improved displays having higher resolutions.

In addition, the user interface has progressed significantly and much effort has been put into providing an intuitive interaction mechanism. A frequently used method for receiving user inputs is by incorporating a touch screen in the device. This allows for a user interaction by the user touching a touch sensitive display.

Conventionally, the touch sensitive display is formed by a transparent touchscreen being placed on top of a display element. The touch screen will thus face the user and when pressed by the user, the device may detect the location of the pressure point and operate in response to this detection. Thus, the touchscreen device will identify the coordinates of the point being pressed whereby the device can determine and perform the selected actions.

However conventional touch sensitive displays are not able to detect a plurality of touches because each signal obtained from each touched location flows in the same electrodes with the signals not being distinguishable. As a result, the signals overlap and only superposition of all the generated signals can be detected.

Furthermore, conventional touch sensitive displays are expensive and tend to be complicated to manufacture. Additionally, they tend to be mechanically sensitive and prone to mechanical failures. Also, conventional touch sensitive displays typically have a touchscreen placed on top of the display element and is therefore placed between the user and the display element. This degrades the optical performance of the touch sensitive display and requires that materials having suitable optical properties are used to implement the touchscreen.

Additionally, conventional displays tend to comprise a large number of layers resulting in a significant thickness of the resulting touch sensitive display. A further disadvantage with many conventional displays is that they require careful calibration in order to provide accurate position detection and especially to provide accurate position detection relative to an image displayed on the touch sensitive display.

Hence, an improved touch sensitive display would be advantageous and, in particular, a touch sensitive display allowing for improved mechanical reliability, reduced cost, reduced complexity of manufacturing, reduced thickness, reduced calibration requirements and improved optical performance

SUMMARY OF THE INVENTION

Accordingly, the Invention preferably seeks to mitigate, alleviate or eliminate one or more of the above mentioned disadvantages singly or in any combination.

According to a first aspect of the invention, there is provided a touch sensitive display comprising: an active matrix display element having a viewer proximal side and a viewer distal side; and a touch sensitive element disposed on the viewer distal side of the active matrix display element and comprising: a first conductive layer comprising a first plurality of conductors; a second conductive layer comprising a second plurality of conductors; and a pressure sensitive layer sandwiched between the first and second conductive layer and operable to modify an electrical conductivity between a first conductor of the first plurality of conductors and a second conductor of the second plurality of conductors in response to a pressure point resulting from an applied pressure.

The invention thus allows for an improved touch sensitive display wherein the touch sensitive element is disposed away from the viewer. Thus the invention allows for the touch sensitive element to be disposed such that it is not between the viewer and the active matrix display. The touch sensitive element thereby does not affect the optical properties of an image of the touch sensitive display. The optical properties of the touch sensitive element are thus not significant and specifically the touch sensitive element may for example be made of semi-translucent or opaque materials. Hence, an improved image of the display may be obtained.

The invention allows for a pressure sensitive layer to be used which preferably requires little or no deformation in order to modify conductivity. Therefore, the mechanical stress and sensitivity of the active matrix display element and the conductor layers may be reduced significantly leading to improved reliability.

The invention also allows for a touch sensitive display which may be easily manufactured and which is cost efficient. Furthermore, a layer structure resulting in a touch sensitive display having reduced thickness may be achieved.

The first and second plurality of conductors may specifically be a first and second plurality of electrodes or electrically conducting paths formed on an isolating layer. The active matrix display element is preferably a reflective active matrix display element. The modification of electrical conductivity may be a reduced conductivity but is preferably an increased conductivity allowing a current to flow between the first conductor and the second conductor. This current may be detected by a sense apparatus thereby allowing for position detection of the pressure point. The touch sensitive element may be disposed directly next to the active matrix display element but preferably one or more layers, such as a passivation layer, is disposed between the touch sensitive element and the touch sensitive display.

According to a feature of the invention, the touch sensitive element comprises a plurality of pressure sensitive elements.

This allows for a practical and convenient implementation wherein position determination may be based on detecting conductivity changes associated with the pressure sensitive elements. The pressure sensitive elements may for example be formed by the touch sensitive element comprising a plurality of separate elements or may be formed by the interaction with other layers including e.g. the first and second conductive layers.

According to a different feature of the invention, the plurality of touch sensitive elements is formed by the first and second plurality of conductors.

Preferably, the touch sensitive element is a homogenous layer wherein the pressure sensitive elements are formed by the conductors of the first and second conductive layers. Specifically, a pressure sensitive element may be formed at each overlapping area between a conductor of the first layer and a conductor of the second layer. This allows for a simple and low cost implementation wherein accurate positioning of the pressure sensitive elements may be achieved.

According to a different feature of the invention, the plurality of pressure sensitive elements is aligned with pixels of the active matrix display element.

This may allow for a very simple and accurate correspondence between pressure sensitive elements and a displayed image and may obviate or mitigate the requirement for calibration. Preferably, the alignment is achieved by aligning the conductors of the first and second conductive layers with the pixels of the active matrix display element.

According to a different feature of the invention, the first plurality of conductors forms rows of a pressure sensitive array. This provides for a particularly simple and convenient implementation which may allow for correspondence between the touch sensitive element and the active matrix display element.

According to a different feature of the invention, the second plurality of conductors forms columns of a pressure sensitive array. This provides for a particularly simple and convenient implementation which may allow for correspondence between the touch sensitive element and the active matrix display element.

According to a different feature of the invention, the pressure sensitive layer comprises a piezoelectric material operable to modify the electrical conductivity. This allows for a particularly suitable implementation. Specifically, this provides process compatibility and thus reduced manufacturing complexity and cost for polymer based active matrix display elements. Furthermore only very little deformation is required for piezoelectric material to result in a detectable change of conductivity thus resulting in improved mechanical performance and improved accuracy of the pressure point detection.

According to a different feature of the invention, the pressure sensitive layer comprises a Micro-ElectroMechanical (MEM) switch operable to modify the electrical conductivity. This allows for a particularly suitable implementation. Specifically this provides process compatibility and thus reduced manufacturing complexity and cost for amorphous silicon based active matrix display elements.

According to a different feature of the invention, the touch sensitive display further comprises detection means operable to determine a position of the pressure point in response to the change in electrical conductivity between the first conductor and the second conductor. This provides for an advantageous implementation allowing accurate position determination. Preferably the detection means may detect that a current or charge flows between the first and second conductor due to the changed conductivity.

According to a different feature of the invention, the detection means is operable to detect a plurality of simultaneous pressure points. Preferably the detection means can simultaneously detect changed conductivities between a plurality of different conductors of the first and second plurality of conductors. This allows for increased flexibility and improved functionality of a device incorporating the touch sensitive display.

According to a different feature of the invention, the detection means comprise a signal source for outputting a signal on the first conductor and a sense amplifier coupled to the second conductor for detecting an electrical signal caused by an electrical conductivity being formed between the first conductor and the second conductor in response to the pressure point. This provides for a suitable, practical and low complexity means of detecting a position of a pressure point.

According to a different feature of the invention, the electrical signal is an electrical charge and the sense amplifier is a charge sensitive amplifier. This provides for a particularly suitable method of detecting a changed conductivity.

According to a different feature of the invention, the touch sensitive display further comprises a display controller having a buffer amplifier operable to provide a display control signal and wherein the touch sensitive display is operable to couple a single amplifier as the buffer amplifier in a display driver configuration and as the signal source in a pressure point detection configuration.

This allows for a particularly advantageous implementation allowing for reduced complexity and component cost of the touch sensitive display thus reducing manufacturing cost.

According to a different feature of the invention, the touch sensitive display further comprises a display controller having a buffer amplifier operable provide a display control signal and wherein the touch sensitive display is operable to couple a single amplifier as the buffer amplifier in a display driver configuration and as the sense amplifier in a pressure point detection configuration.

This allows for a particularly advantageous implementation allowing for reduced complexity and component cost of the touch sensitive display thus reducing manufacturing cost.

According to a second aspect of the invention, there is provided a portable device comprising a touch sensitive display as described above.

These and other aspects, features and advantages of the invention will be apparent from and elucidated with reference to the embodiment(s) described hereinafter.

BRIEF DESCRIPTION OF THE DRAWINGS

An embodiment of the invention will be described, by way of example only, with reference to the drawings, in which.

DESCRIPTION OF PREFERRED EMBODIMENTS

The following description focuses on an embodiment of the invention applicable to a portable device such as a Personal Digital Assistant (PDA), a mobile phone or a personal music system. However, it will be appreciated that the invention is not limited to this application but may be applied to many other portable or non-portable devices.

Figure 1:
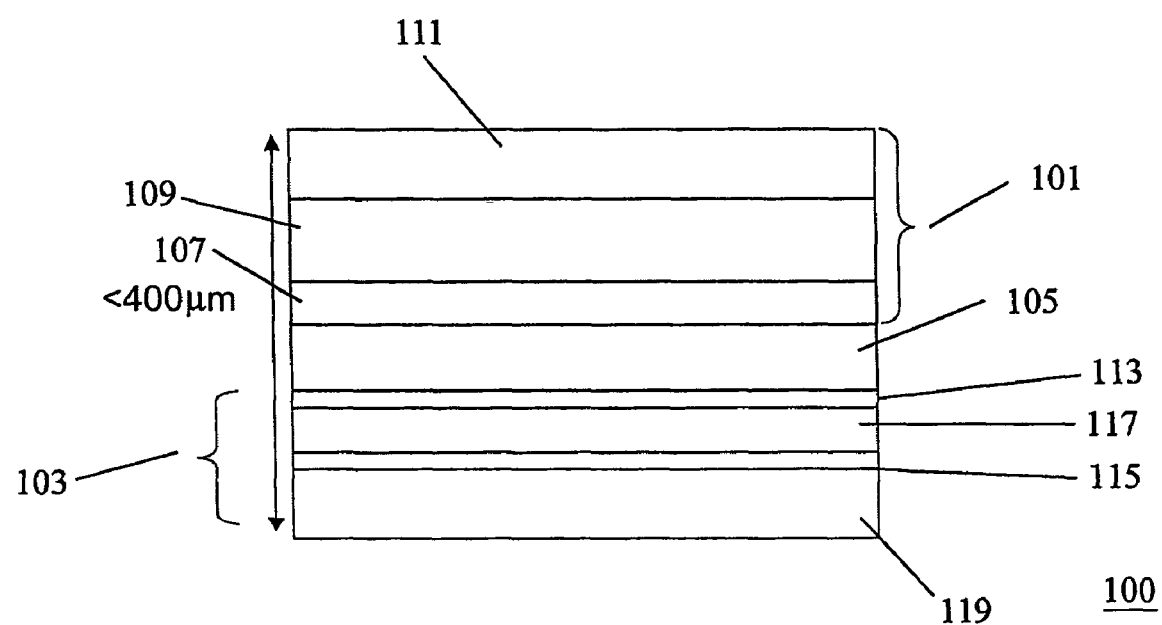
FIG. 1 illustrates a cross sectional view of a touch sensitive display in accordance with a preferred embodiment of the invention.

FIG. 1 illustrates a cross sectional view of a touch sensitive display 100 in accordance with a preferred embodiment of the invention.

The touch sensitive display 100 comprises an active matrix display element 101 and a touch sensitive element 103 separated by a passivation layer 105. In other embodiments the matrix display element 101 may be next to the touch sensitive element 103 or other and/or additional layers may be disposed between the matrix display element 101 and the touch sensitive element 103.

The active matrix display element 101 has a viewer proximal side and a viewer distal side. In FIG. 1, the viewer proximal side is shown as the upper side and the viewer distal side is the lower side. Thus, in use the touch sensitive display 100 of FIG. 1 is viewed from the upper end of the layer structure.

In the preferred embodiment, the active matrix display element 101 comprises three layers. Closest to the viewer distal side is an active matrix layer 107 which comprises pixel transistors and associated pixel electrodes. Above the active matrix layer 107 is an electrophoretic electro-optical layer 109 operable to change an optical characteristic in response to a corresponding pixel charge of the active matrix layer. On top of the electrophoretic electro-optical layer 109 is a protective layer 111 which provides protection for the touch sensitive display 100.

In the preferred embodiment, the protective layer 111 is preferably of plastic as this is suitable for allowing a localized, high pressure activation being conveyed to the touch sensitive element 103 in response to a user pressing the top of the touch sensitive display 100.

In the preferred embodiment, the active matrix display element 101 is a reflective active matrix display element as known to the person skilled in the art and for brevity and clarity further details will not be provided here.

In the preferred embodiment, the active matrix display element 101 and the touch sensitive element 103 are separated by a passivation layer which isolates the touch sensitive element from the active matrix display and planarizes the surface for the active matrix structure to be build on.

The touch sensitive element 103 of the preferred embodiment comprises a first conductive layer 113 and a second conductive layer 115 with a pressure sensitive layer 117 sandwiched between them. The second conductive layer 115 is disposed on a substrate 119 which is preferably a glass substrate.

In the preferred embodiment, both the first and second conductive layers 113, 115 are patterned. Thus, the first conductive layer 113 comprises a first plurality of conductors and the second conductive layer 115 comprises a second plurality of conductors. In the preferred embodiment, the first and second plurality of conductors together form a matrix arrangement wherein the first plurality of conductors are substantially perpendicular to the second plurality of conductors. Thus one plurality of conductors forms rows of a touch sensitivity matrix and the other plurality of conductors forms columns of the touch sensitivity matrix.

In the preferred embodiment, the pressure sensitive layer 117 comprises a material which is operable to modify an electrical conductivity between a first conductor of the first plurality of conductors and a second conductor of the second plurality of conductors in response to a pressure point resulting from an applied pressure. Hence, if a user presses the top of the touch sensitive display 100 this pressures is conveyed to the pressure sensitive layer 117 which in response locally changes the conductivity between the first and second conductive layers 113, 115. For example, the pressure sensitive layer 117 may comprise piezoelectrical material which increases conductivity (reduces resistance) when a pressure is applied.

The change in conductivity can be detected for example by measuring the resistance between conductors of the different conductive layers 113, 115. By detecting between which conductors a conductive path has been formed, a position of the pressure point may be determined.

Thus, in accordance with the preferred embodiment of the invention, touch sensitive functionality is achieved by three layers disposed beneath the active-matrix display element 101. Thus, the touch sensitive element 103 is not between the active-matrix display element 101 and the viewer and therefore does not impair the optical performance of the active-matrix display element 101. Accordingly a much improved optical performance is achieved.

Furthermore, the layered structure may easily be manufactured and provides for a touch sensitive display having reduced thickness. Furthermore, as a pressure sensitive layer may be used which require very little (or no) deformation in order to change conductivity in response to applied pressure, only low mechanical stress and bending is caused thus resulting in an improved and more reliable touch sensitive display.

Active matrix display elements typically comprise a number of pixels arranged in a rectangular array. Typically, all pixels in the same row of the array are coupled to the same display controller output and all pixels in the same column of the array are coupled to another display controller output. Thus the individual pixels may be controlled by outputting the appropriate signals on the corresponding row and column electrodes.

In the preferred embodiment, the touch sensitive element comprises a plurality of pressure sensitive elements. Preferably, each of these pressure sensitive elements corresponds to a specific pixel of the active matrix display element. Thus, in the preferred embodiment, the pressure sensitive elements are aligned with pixels of the active matrix display element.

In the preferred embodiment, the pressure sensitive elements are not formed as individual structures in the pressure sensitive layer but are rather formed by the interaction between the conducting layers and the pressure sensitive layer. Specifically, the pressure sensitive elements are formed by the geometry of the conductors of the first and second conductive layers. Thus, pressure sensitive elements may be formed wherever a conductor of the first conductive layer overlaps a conductor of the second conductive layer.

In the preferred embodiment, the first conductive layer comprises a number of conductors each of which is aligned with a column of the active matrix display element. Similarly, the second conductive layer comprises a number of conductors each of which is aligned with a row of the active matrix display element. Thus, the conductors of the two layers form an array of overlapping areas which are aligned with the pixels. As the pressure sensitive layer sandwiched between the two conductor layers change the conductivity in response to an applied pressure, each overlapping area forms a pressure sensitive element. A pressure being applied to a pressure sensitive element can be detected by detecting the change in conductivity between the corresponding row conductor and column conductor. Thus a touch sensitive array having pressure sensitive elements aligned with the pixels of the active matrix display element is achieved.

Accordingly, a very accurate position determination inherently aligned with a displayed image is achieved. This improves performance of the touch sensitive display and obviates the requirement for calibration of the touch sensitive element or the alignment between the touch sensitive element and the active matrix display element.

It will be appreciated that the terms columns and rows are used to indicate the substantially perpendicular directions of elements in an array and that the terms row and column may be used interchangeably.

In the preferred embodiment, the pressure sensitive layer comprises a piezoelectric material operable to modify the electrical conductivity.

Figure 2:
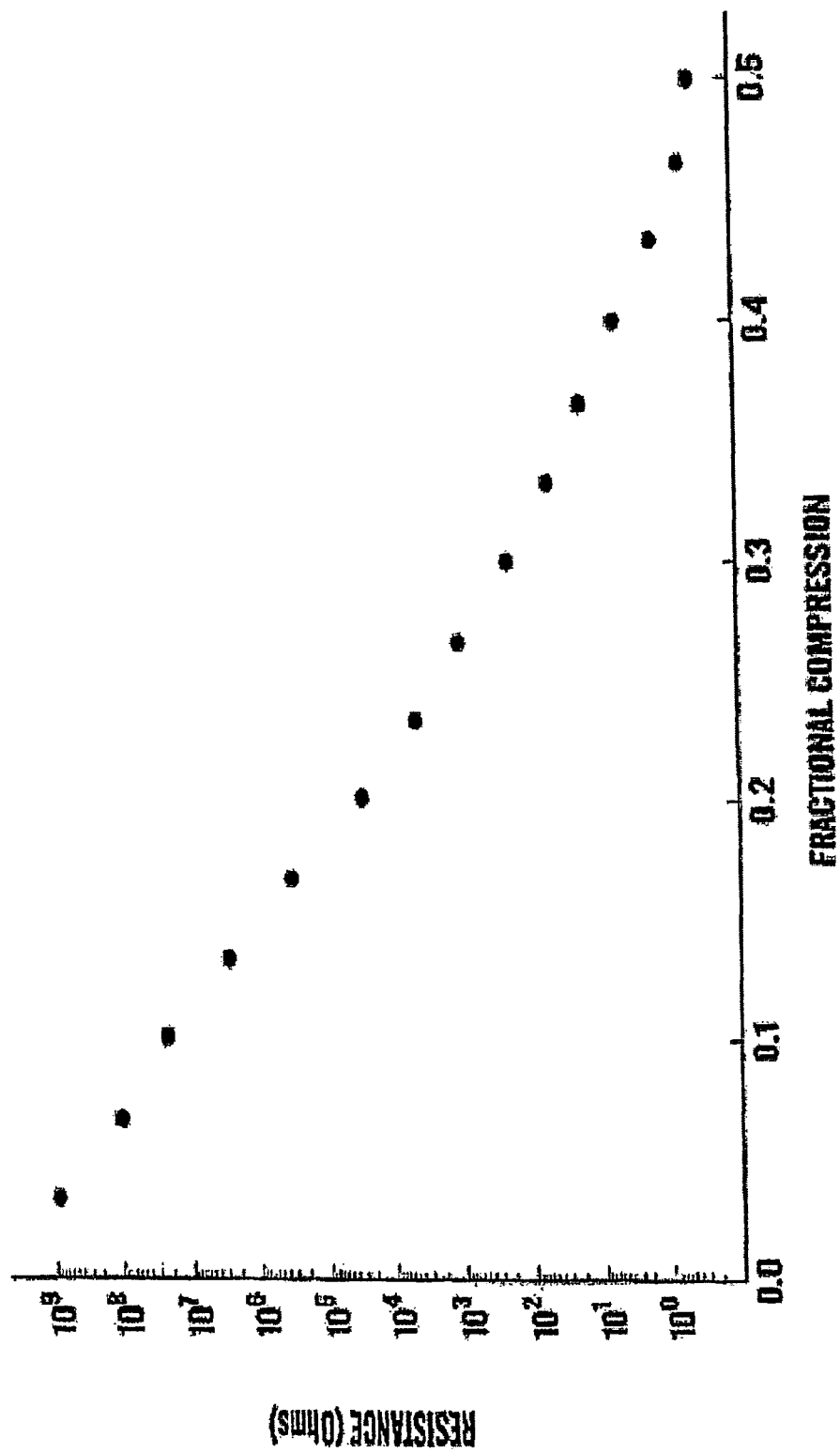
FIG. 2 illustrates an electrical resistance as a function of a fractional compression of a piezoelectric material.

FIG. 2 illustrates an electrical resistance as a function of a fractional compression of a piezoelectric material. As illustrated in FIG. 2 the resistance may decrease from a resistance above $10^9$ Ohms to around 1 MOhm for less than a 15% fractional compression. This difference may easily be accurately detected and thus only a very small compression of the touch sensitive display is required. This allows for mechanical stress caused by bending or flexing of the layers to be minimised and provides for improved mechanical reliability.

In other embodiments, the pressure sensitive layer comprises a Micro-ElectroMechanical (MEM) switch which is operable to modify the electrical conductivity. A MEM is typically a micron scale construction wherein a conductor of the first conducting layer is normally mechanically separated from a conductor of the second conducting layer. Pressure exerted on the MEM switch momentarily deforms the construction in a manner wherein the conductor of the first conducting layer mechanically makes physical contact with the conductor of the second conducting layer thereby establishing an electrical connection.

The preferred implementation of the pressure sensitive layer may depend on the process compatibility of the different layers during manufacturing. Thus a MEM switch layer is more suitable for an active matrix implemented on amorphous silicon while the piezoelectric material is more suitable for an active matrix implemented using polymer electronics.

In the preferred embodiment, the touch sensitive display further comprises detection means which can determine the position of the pressure point in response to the change in electrical conductivity between conductors of the first and second conductor layers. In the preferred embodiment, all or part of the detection means for the touch sensitive element may be comprised with the addressing means of the active matrix display element in a single integrated circuit.

Figure 3:
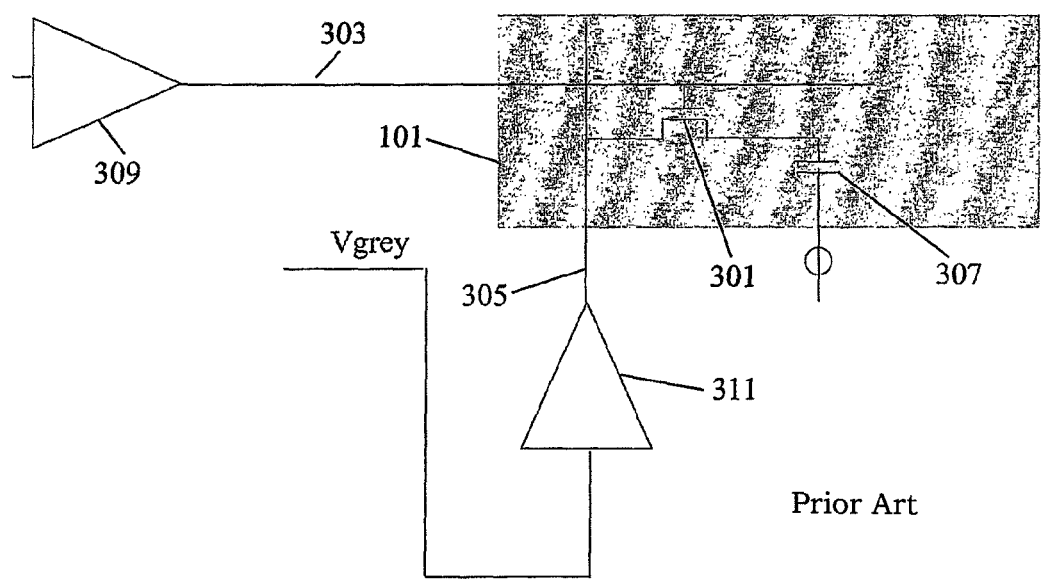
FIG. 3 illustrates a conventional display controller for an active matrix display element.

FIG. 3 illustrates a conventional display controller for an active matrix display element.

The active matrix display element 101 comprises a large number of pixels. The components associated with one pixel are illustrated in FIG. 3. A pixel transistor 301 has a gate coupled to a row electrode 303 and a drain coupled to a column electrode 305. The source of the pixel transistor 301 is coupled to a pixel capacitor 307 which stores the charge that modifies the optical state of the electrophoretic electro-optical layer. Thus the pixel capacitor 307 physically extends for most of the area of the pixel.

A row buffer amplifier 309 is coupled to the row electrode 303 and is operable to provide a row drive signal to the gate of the pixel transistor 301. Similarly, a column buffer amplifier 311 is coupled to the column electrode 305 and is operable to provide a column drive signal to the gate of the pixel transistor 301. The column buffer amplifier 311 receives a signal $V_{Grey}$ which corresponds to the desired brightness level of the pixel.

In operation, charge may be supplied to/withdrawn from the pixel capacitor 307 by applying a voltage to the row electrode 303 thereby switching the pixel transistor on. The appropriate signal may then be applied to the column electrode to supply or withdraw charge from the pixel capacitor 307.

Figure 4:
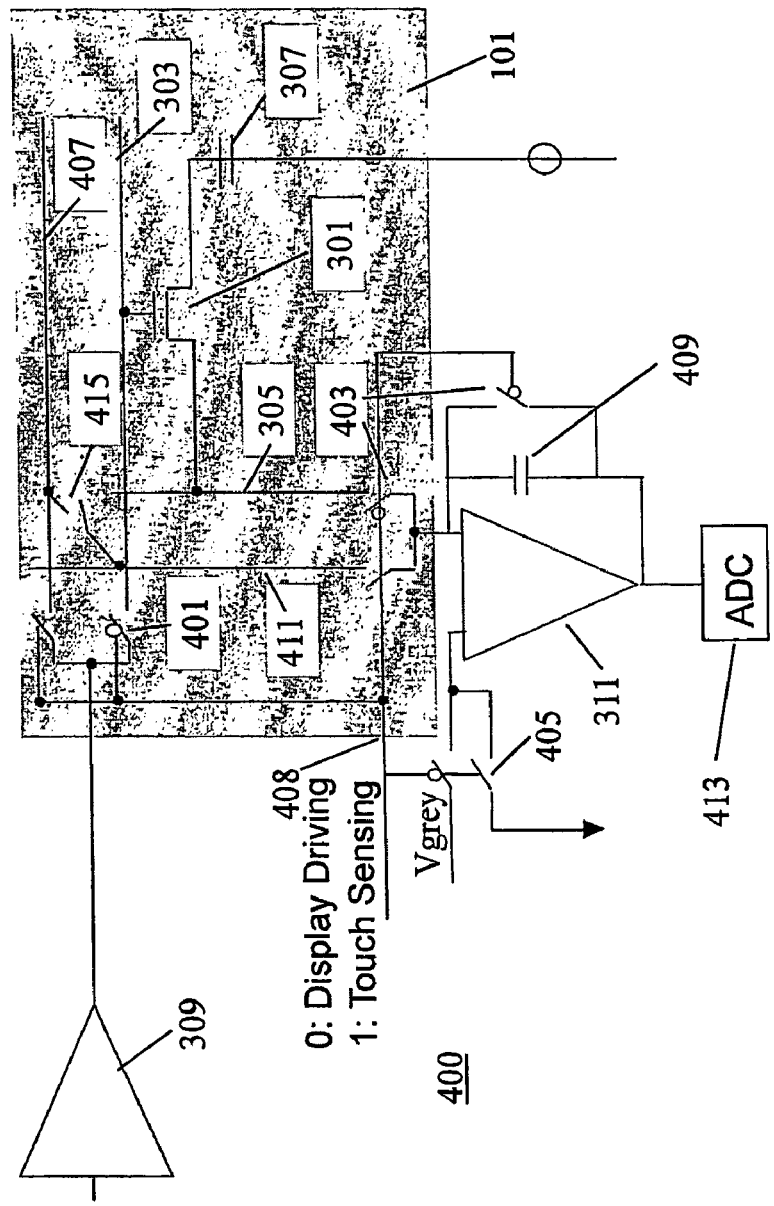
FIG. 4 illustrates a drive circuit for a touch sensitive display in accordance with a preferred embodiment of the invention.

FIG. 4 illustrates a drive circuit 400 for a touch sensitive display in accordance with a preferred embodiment of the invention.

As illustrated, the drive circuit 400 reuses a number of components from a conventional display drive circuit as illustrated in FIG. 3 and the same reference signs have been used for the corresponding components.

However, in contrast to the circuit of FIG. 3, the row buffer amplifier 309 of the drive circuit 400 of FIG. 4 is coupled to the row electrode through a row differential switch 401. Similarly, the column buffer amplifier 311 of the drive circuit 400 of FIG. 4 is coupled to the column electrode 305 through a column differential switch 403. Furthermore, the signal $V_{Grey}$ is coupled to the column buffer amplifier 311 through an input differential switch 405.

The three differential switches 401, 403, 405 are all controlled by a configuration signal 408. When the configuration signal 408 is in a display driver configuration, the three differential switches 401, 403, 405 close the connections illustrated by a ° in FIG. 4. As can be seen, the drive circuits of FIGS. 3 and 4 are in this situation functionally equivalent and the conventional approach for controlling the signal may thus be used.

However, when the configuration signal 408 is in a pressure point detection or touch sensing configuration, the differential switches 401, 403, 405 take the reverse position where connections illustrated by ° in FIG. 4 are open and the connections not illustrated by ° are closed.

As illustrated in FIG. 4, the row buffer amplifier 309 is in this connection coupled to a row electrode 407 of the first conductive layer of the touch sensitive element. Furthermore, the column buffer amplifier 311 is coupled as a sense amplifier and specifically as a charge sensitive amplifier (using the capacitor 409 coupled between the amplifier output and input). The input of the charge sensitive amplifier is coupled to a column electrode 411 of the second conductive layer of the touch sensitive element. The output of the charge sensitive amplifier is coupled to an Analogue to Digital Converter (ADC) 413.

As previously described, a pressure sensitive element operable to change the electrical conductivity between the row electrode 407 and the column electrode 411 is formed. Specifically, a switch 415 may be formed.

In operation in the pressure point detection configuration, the row buffer amplifier 309 may output a signal (e.g. a voltage) on the row electrode 407. If a pressure is applied at the location of the pressure sensitive element 415, a charge will result on the column electrode 411. This charge will be detected by the charge sensitive amplifier 311 which in response generates an output voltage that is digitised by the ADC 413. As the position of the pressure sensitive elements 415 is accurately known, an accurate position determination is achieved. Furthermore, as the charge depends on the conductivity of the pressure sensitive elements which, in the preferred embodiment, depends on the applied pressure, information is generated of the magnitude of the applied pressure.

The described drive circuitry allows for a reduced manufacturing cost and reduced complexity. Specifically, the drive circuit allows for the (row and column) buffer amplifiers of an active matrix display element to be re-used as a signal source and/or sense amplifier for a touch sensitive element. Furthermore, not only may the number of required amplifiers be reduced substantially but the number of conductors required between the display driver circuit and the active matrix display may be reduced.

A further advantage of the preferred embodiment is that it allows for a plurality of simultaneous pressure points to be detected. For example, if two touch sensitive elements form a connection between different row and column electrodes the sense amplifiers of each respective column electrode may independently generate a touch indication.

In the preferred embodiment, the touch sensitive element comprises two patterned conductor layers layer sandwiching a piezoresistive material. However, it will be appreciated that in other embodiments, the conductors may not be patterned. Thus the plurality of conductors need not be separate isolated conductors but may be different overlapping and dynamically varying conductive paths or directions in an unpatterned conductor layer.

The invention can be implemented in any suitable form. The elements and components of an embodiment of the invention may be physically, functionally and logically implemented in any suitable way. Indeed the functionality may be implemented in a single unit, in a plurality of units or as part of other functional units.

Although the present invention has been described in connection with the preferred embodiment, it is not intended to be limited to the specific form set forth herein. Rather, the scope of the present invention is limited only by the accompanying claims. In the claims, the term comprising does not exclude the presence of other elements or steps. Furthermore, although individually listed, a plurality of means, elements or method steps may be implemented by e.g. a single unit or processor. Additionally, although individual features may be included in different claims, these may possibly be advantageously combined, and the inclusion in different claims does not imply that a combination of features is no feasible and/or advantageous. In addition, singular references do not exclude a plurality. Thus references to "a", "an", "first", "second" etc do not preclude a plurality.

The invention claimed is:

1. A touch sensitive display comprising:
    an active matrix display element having a viewer proximal side and a viewer distal side and comprising a pixel array with rows and columns of pixels; and
    a touch sensitive element disposed on the viewer distal side of the active matrix display element, wherein the touch sensitive element comprises:
        a first conductive layer comprising a first plurality of conductors;
        a second conductive layer comprising a second plurality of conductors; and
        a pressure sensitive layer sandwiched between the first conductive layer and the second conductive layer and operable to modify an electrical conductivity between a first conductor of the first plurality of conductors and a second conductor of the second plurality of conductors in response to a pressure point resulting from an applied pressure, characterized in that:
    the first plurality of conductors are row conductors of the touch sensitive element and the second plurality of conductors are column conductors of the touch sensitive element,
    each row of pixels shares a respective row buffer amplifier with a touch sensitive element row conductor, and
    each column of pixels shares a respective column buffer amplifier with a touch sensitive element column conductor; and
    wherein the respective row buffer amplifier and column buffer amplifier synchronously operate under a time-division multiplexed control to carry out mutually exclusive functions of touch sensing and pixel value setting.

2. A touch sensitive display as claimed in claim 1 wherein the touch sensitive element comprises a plurality of pressure sensitive elements.

3. A touch sensitive display as claimed in claim 2 wherein the plurality of pressure sensitive elements is aligned with pixels of the active matrix display element.

4. A touch sensitive display as claimed in claim 1 wherein the pressure sensitive layer comprises a piezoelectric material operable to modify the electrical conductivity.

5. A touch sensitive display as claimed in claim 1 wherein the pressure sensitive layer comprises Micro-ElectroMechanical (MEM) switches operable to modify the electrical conductivity.

6. A touch sensitive display as claimed in claim 1, further comprising detection means operable to determine a position of the pressure point in response to the change in electrical conductivity between the first conductor and the second conductor.

7. A touch sensitive display as claimed in claim 6 wherein the detection means is operable to detect a plurality of simultaneous pressure points.

8. A touch sensitive display as claimed in claim 6 wherein the detection means comprise:
    a signal source for outputting an electrical signal; and
    a sense amplifier for sensing an electrical signal;
    wherein the detection means includes a circuit comprising:
        the signal source, the sense amplifier, the pressure sensitive layer at the pressure point, and the first conductor and the second conductor coupled to one of either the signal source or sense amplifier; and
    wherein the circuit of the detection means is arranged to enable the sense amplifier to detect an electrical signal caused by an electrical conductivity being formed between the first conductor and the second conductor in response to the pressure point.

9. A touch sensitive display as claimed in claim 8 wherein the electrical signal is an electrical charge and the sense amplifier is a charge sensitive amplifier.

10. A touch sensitive display as claimed in claim 8 further comprising a display controller, wherein the display controller uses the row buffer amplifier to provide a display control signal in a display driver configuration, and wherein the touch sensitive display is further operable to use the row buffer amplifier as a signal source in a pressure point detection configuration.

11. A touch sensitive display as claimed in claim 8 further comprising a display controller, wherein the display controller uses the column buffer amplifier to provide a display control signal in a display driver configuration, and wherein the touch sensitive display is further operable to use the column buffer amplifier as the sense amplifier in a pressure point detection configuration.

12. A portable device comprising a touch sensitive display as claimed in claim 1.

13. The touch sensitive display of claim 1 wherein the time-division multiplexed control is carried out via differential switches.

14. The touch sensitive display of claim 1 wherein the time-division multiplexed control is carried out via three differential switches controlled by a configuration signal.

15. The touch sensitive display of claim 1 wherein the time-division multiplexed control is carried out via a set of differential switches comprising:
    a row differential switch coupling the row buffer amplifier to the row electrode,
    a column differential switch coupling the row buffer amplifier to the column electrode, and
    an input differential switch coupling the column buffer amplifier to a signal corresponding to a desired pixel grey level.

16. A touch sensitive display as claimed in claim 1 wherein at least one of the respective row buffer amplifier and column buffer amplifier operates as a touch sensor signal receiver.

17. A touch sensitive display as claimed in claim 8 wherein the row buffer amplifier is the signal source and the column buffer amplifier is the sense amplifier.

18. A touch sensitive display comprising:
- an active matrix display element having a viewer proximal side and a viewer distal side and comprising a pixel array with rows and columns of pixels; and
- a touch sensitive element disposed on the viewer distal side of the active matrix display element, wherein the touch sensitive element comprises:
    - a first conductive layer comprising a first plurality of conductors;
    - a second conductive layer comprising a second plurality of conductors; and
    - a pressure sensitive layer sandwiched between the first conductive layer and the second conductive layer and operable to modify an electrical conductivity between a first conductor of the first plurality of conductors and a second conductor of the second plurality of conductors in response to a pressure point resulting from an applied pressure, characterized in that:
- the first plurality of conductors are row conductors of the touch sensitive element and the second plurality of conductors are column conductors of the touch sensitive element,
- each row of pixels shares a respective row buffer amplifier with a touch sensitive element row conductor, and
- each column of pixels shares a respective column buffer amplifier with a touch sensitive element column conductor; and
- wherein at least one of the respective row buffer amplifier and column buffer amplifier operates as a touch sensor signal receiver.

* * * * *